Dec. 1, 1931.  A. E. SHAW  1,833,978
GLOBE HOLDER
Filed Feb. 17, 1931
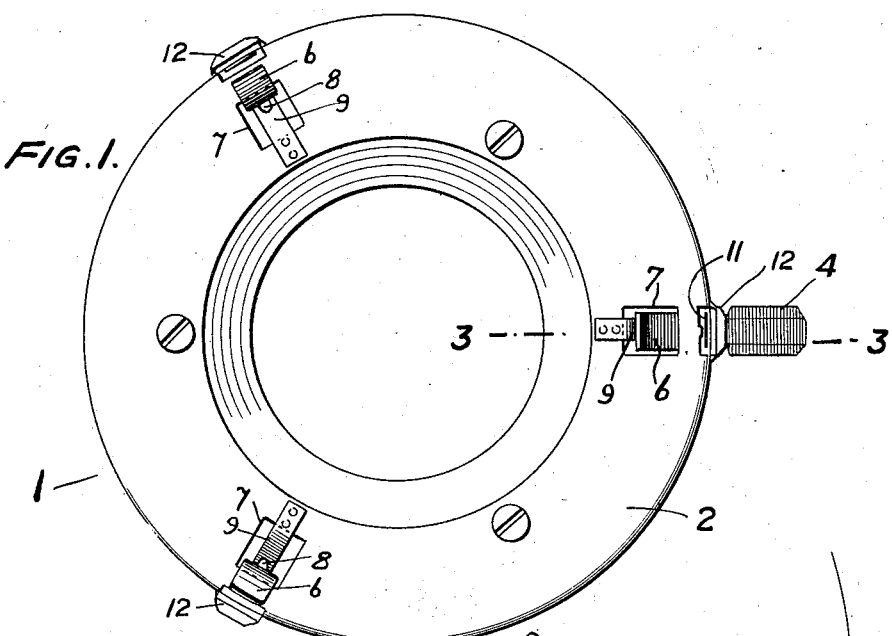
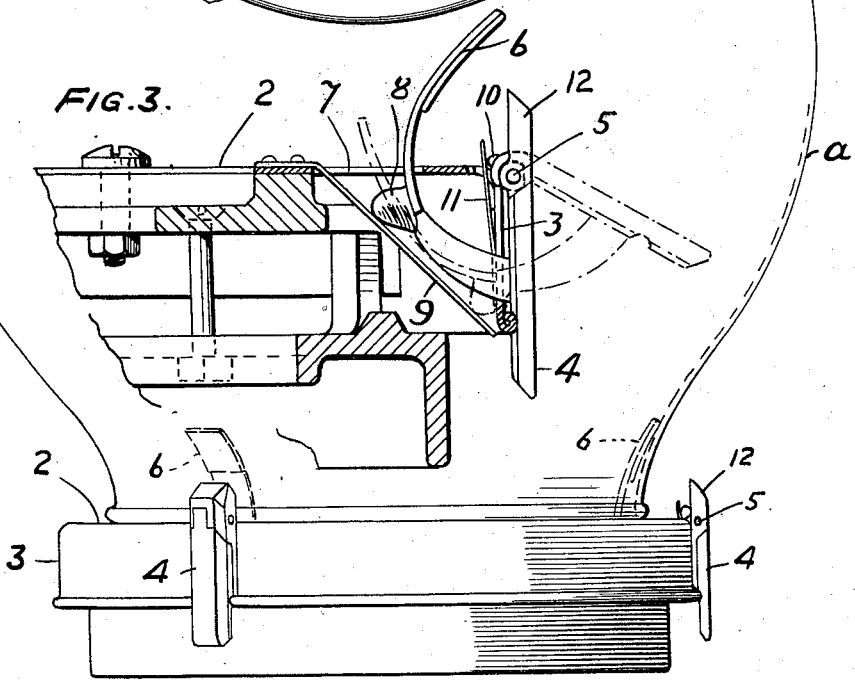
INVENTOR
Arthur E. Shaw
BY
Augustus B. Stoughton.
ATTORNEY.
WITNESS:

Patented Dec. 1, 1931

1,833,978

UNITED STATES PATENT OFFICE

ARTHUR E. SHAW, OF PHILADELPHIA, PENNSYLVANIA, ASSIGNOR TO PENNSYLVANIA GLOBE COMPANY, OF PHILADELPHIA, PENNSYLVANIA, A CORPORATION OF PENNSYLVANIA

GLOBE HOLDER

Application filed February 17, 1931. Serial No. 516,325.

Globes are expensive, fragile, and, in some cases, large enough, when in exposed positions, to be subject to considerable wind pressure, and when used on posts it is desirable that they may be readily mounted and dismounted, and while held firmly they should not be subjected to undue pressure.

Objects of the present invention are to provide a reliable globe holder adapted to fulfill the requirements referred to, and capable of being operated by one hand.

Other objects of the invention will appear from the following description at the end of which the invention will be claimed.

Generally stated, the invention may be said to comprise a base, finger pieces disposed in a circle and mounted on the base for turning movements radially of the circle and each equipped with a globe holding arm extending through and above the base, and projections and their complemental springs interposed between the base and the finger pieces to permit the finger pieces and arms to be turned outward into and held in globe receiving position, and to be turned inward to cause the arms to press upon the inner surface of the globe and hold the same.

In the following description reference will be made to the accompanying drawings illustrating one embodiment selected from other embodiments for the sake of description and in the drawings Figure 1 is a top or plan view.

Figure 2 is an elevational view, and

Figure 3 is a sectional view taken on the line 3—3 of Figure 1 and drawn to an enlarged scale.

In the drawings, 1 generally indicates a base and it is shown to include a flat ring portion 2 having a depending flange 3. 4 indicates finger pieces shown as arranged at the outside of the ring portion 2, and they are pivoted, as at 5, at one end thereof to the margin of the ring for turning movement in radial direction. It might be more accurate to say that, as shown, the finger pieces 4 are pivoted in elements 12 secured to the flange portion 3. 6 indicates curved globe holding arms and they are carried by the finger pieces 4 and are arranged to project through openings 7 provided in the flat ring portion 2. 8 indicates riders projecting from arms 6. 9 indicates springs carried by the base and pressing on the riders. As shown in the drawings, the fingers are provided with riders 10 upon which press springs 11 carried by the depending flange portion 3 of the base.

The mode of operation of the described device may be explained as follows:

To apply a globe, the finger pieces 4 are turned into the position indicated by dash and dot lines in Fig. 3, and the springs 11 and riders 10 operate to hold them in that position. The globe is then placed on the portion 2 and the finger pieces 4 are moved into the position indicated in full lines in Fig. 3, bringing the globe holding arms 6 up to the inner surface of the globe against which they are pressed by the spring 9 and rider 8 with the proper degree of pressure.

It may be remarked that the finger pieces can be operated one at a time with one hand and that the globe holding arms properly hold the globe without subjecting it to uneven or excessive pressure. The spring pressed riders may serve to hold the globe holding arms against the globe with a yielding pressure. If desired the ends of the arms 6, which cooperate with the inner face of the globe, may be provided with springs, pads or the like.

It will be obvious to those skilled in the art to which the invention relates that modifications may be made in details of construction and arrangement and in matters of mere form so that the invention is not limited in regard to such matters or otherwise than as the prior art and the appended claims may require.

I claim:

1. A globe holder comprising in combination a base, finger pieces disposed in a circle and pivotally mounted on the base for turning movement radially of the circle and each equipped with a globe holding arm extending through and above the base, and projections and their complemental flat springs interposed between the base and the finger pieces and adapted to provide two positions of rest for the finger pieces.

2. A globe holder comprising in combination a base including a flat ring portion having a depending flange, finger pieces arranged at the outside of the ring portion and pivoted at one end thereof to the margin of the ring for turning movement in radial direction, curved globe holding arms carried by the finger pieces and arranged to project through openings provided in the flat ring portion, riders projecting from the arms, and springs carried by the base and pressing on the riders.

3. A globe holder comprising in combination a base including a flat ring portion having a depending flange, finger pieces arranged at the outside of the ring portion and pivoted at one end thereof to the margin of the ring for turning movement in radial direction, curved globe holding arms carried by the finger pieces and arranged to project through openings provided in the flat ring portion, riders on the arms and on the finger pieces, and springs carried by the base and pressing on the riders.

4. A globe holder comprising in combination a base including a flat ring portion having a depending flange, finger pieces arranged at the outside of the ring portion and pivoted at one end thereof to the margin of the ring for turning movement in radial direction, globe holding arms carried by the finger pieces and arranged to project through openings provided in the flat ring portion, and spring pressed riders for positioning the globe holding arms.

ARTHUR E. SHAW.